(12) United States Patent
Smith

(10) Patent No.: US 12,119,624 B2
(45) Date of Patent: Oct. 15, 2024

(54) WALL CAVITY ELECTRICAL CUPBOARD SYSTEM

(71) Applicant: JTSHOLDINGS PTY LTD, Hallam (AU)

(72) Inventor: Jared Smith, Hallam (AU)

(73) Assignee: JTSHOLDINGS PTY LTD, Hallam (AU)

( * ) Notice: Subject to any disclaimer, the term of this patent is extended or adjusted under 35 U.S.C. 154(b) by 237 days.

(21) Appl. No.: 17/702,134

(22) Filed: Mar. 23, 2022

(65) Prior Publication Data

US 2022/0216677 A1 Jul. 7, 2022

Related U.S. Application Data

(63) Continuation of application No. PCT/AU2020/051017, filed on Sep. 24, 2020.

(30) Foreign Application Priority Data

Sep. 24, 2019 (AU) .................................. 2019903565

(51) Int. Cl.
   *H02B 1/30* (2006.01)
   *H02B 1/38* (2006.01)

(52) U.S. Cl.
   CPC ............. *H02B 1/301* (2013.01); *H02B 1/305* (2013.01); *H02B 1/38* (2013.01)

(58) Field of Classification Search
   CPC ......... H02B 1/301; H02B 1/305; H02B 1/38; H02B 1/40; H02B 1/44; H02B 1/066; H02G 3/123
   See application file for complete search history.

(56) References Cited

U.S. PATENT DOCUMENTS 3,618,804 A * 11/1971 Krause ..................... H02G 3/14
                                                    D13/164
4,909,551 A *  3/1990 Buchanan ................ H02B 1/40
                                                    292/DIG. 61

(Continued)

FOREIGN PATENT DOCUMENTS

GB         2448422 A  * 10/2008  ............. H02G 3/081
GB         2452060 A     2/2009
(Continued)

OTHER PUBLICATIONS

International Search Report and Written Opinion of the International Searching Authority issued by the Australian Patent Office for International Patent Application No. PCT/AU2020/051017, mailed on Nov. 27, 2020.

*Primary Examiner* — Hanh V Tran
(74) *Attorney, Agent, or Firm* — Myers Wolin, LLC

(57) ABSTRACT

A wall cavity electrical cupboard system is provided for allowing flush mounting with ready electrical access wiring that is received through holes of the cavity container and can feed along the circumferential channel and into holes of the template openings and can be connected to control means in the electrical mounting module mounted on the support brackets such as fuses, surge protectors, short circuit protection cutoffs etc. Only the front switches or indicators appear through cut outs. The channel and the template openings provide a benefit that the wiring therefore can be selectively moved around and readily connected without needing to line up the holes of the cavity container and the electrical container and with adjustability and safety of placing wiring connection behind the sealing protector plate covering the opening except for what is allowable to show through the cutouts and be mounted on the support brackets.

9 Claims, 14 Drawing Sheets

(56) References Cited

U.S. PATENT DOCUMENTS

| | | | | |
|---|---|---|---|---|
| 5,573,321 A * | 11/1996 | Bell, Jr. | ............ | H02G 3/123 |
| | | | | 174/505 |
| 6,010,361 A * | 1/2000 | Goudal | ............ | H02B 1/40 |
| | | | | 439/553 |
| 6,931,794 B1 | 8/2005 | Burgess | | |
| 7,209,343 B2 * | 4/2007 | Remmert | ............ | H02B 1/056 |
| | | | | 361/652 |
| 7,319,192 B1 * | 1/2008 | Gretz | ............ | H02G 3/123 |
| | | | | 174/53 |
| 2008/0006624 A1 * | 1/2008 | Davis | ............ | H02G 3/16 |
| | | | | 220/3.2 |
| 2008/0264664 A1 * | 10/2008 | Dinh | ............ | H02G 3/185 |
| | | | | 174/50 |
| 2009/0001082 A1 * | 1/2009 | Goldenne | ............ | H02G 3/121 |
| | | | | 220/477 |
| 2009/0178822 A1 * | 7/2009 | Davis | ............ | H02G 3/16 |
| | | | | 174/58 |
| 2010/0046147 A1 * | 2/2010 | Ranta | ............ | H02B 1/056 |
| | | | | 361/627 |
| 2014/0159552 A1 * | 6/2014 | Bravo | ............ | H02G 3/086 |
| | | | | 312/198 |
| 2015/0263492 A1 * | 9/2015 | Nguyen | ............ | H02B 1/056 |
| | | | | 174/563 |
| 2016/0241002 A1 * | 8/2016 | Tremaine | ............ | H02B 1/44 |
| 2018/0205206 A1 * | 7/2018 | Bazhinov | ............ | H02B 1/066 |
| 2018/0252888 A1 * | 9/2018 | Carapella | ............ | H02G 3/083 |

FOREIGN PATENT DOCUMENTS

| | | | | | |
|---|---|---|---|---|---|
| GB | 2464993 | A | | 5/2010 | |
| JP | 2004166338 | A | * | 6/2004 | |
| WO | WO-2021044054 | A1 | * | 3/2021 | ............ H02G 3/086 |

* cited by examiner

WALL CAVITY ELECTRICAL CUPBOARD SYSTEM

CROSS REFERENCE TO RELATED APPLICATIONS

This application is a continuation of International Application No. PCT/AU2020/051017, filed Sep. 24, 2020, which takes priority from Australian Provisional Patent Application No. 2019903565, filed Sep. 24, 2019, the contents of each of which are incorporated by reference herein.

TECHNICAL FIELD

The present invention relates to a wall cavity electrical cupboard system for housing switching and interrupting devices such as fuses, circuit breakers, relays and associated controls, instrumentation and metering devices.

The invention has been developed primarily for use as a wall cavity electrical cupboard system allowing flush mounting with ready electrical access and will be described hereinafter with reference to this application. However, it will be appreciated that the invention is not limited to this particular field of use.

BACKGROUND

A wall mounted electrical cupboard type of enclosure is common as a "switchboard" and "sub board" type classification of enclosure. The main purpose is to house electrical circuit breakers which control the power flow out to sub circuits. These types of enclosures are common in the electrical industry with domestic properties and buildings requiring one or many.

The main type of switchboard is an external surface mounted enclosure, which is normally fully mounted on the surface and protrudes out. This is commonplace in traditional houses and industry where switchboards can be readily accessed for meter reading.

With the increase in complex high-rise developments where IOC's of apartments may be built and exist in multi-levels, the traditional switchboard has been incorporated within an apartment by surface mounting on an internal wall.

In addition, the surface mounting of a switchboard in an apartment means that some of the available volume of space available becomes even more constrained as the switchboard ordinarily would protrude out. The nature of the switchboard protruding outwards may also detract from the overall appearance of the apartment.

It can be seen that known prior art wall mounted electrical cupboard has the problems of:
a) Affecting the aesthetics of an apartment or the like dwelling
b) Less available room space The present invention seeks to provide a wall cavity electrical cupboard system, which will overcome or substantially ameliorate at least one or more of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY

According to a first of the present invention, a wall cavity electrical cupboard system is provided for allowing flush mounting with ready electrical access comprising: a. a base mounting module including a cavity container having a rear wall and circumferential side walls with a front opening and mountable substantially flush to and between a set of parallel spaced studs; b. an electrical mounting module including an electrical container having a rear wall and circumferential side walls with at least one front opening for holding a plurality of electrical fittings including switches and fuses, and the electrical container being mountable in the cavity container and sized to allow circumferential spacing forming a circumferential channel between the electrical container and the side walls of the cavity container; c. a door mounted to the base mounting module for closing the front opening and being substantially flush to the wall.

The wall cavity electrical cupboard system provides the benefit of fitting the cupboard flush with an existing wall. This vastly improves aesthetics and is particularly relevant to quick installations and economy of scale in multi-apartment high rise buildings.

The cavity container can include access holes in one or more of the side walls of the cavity container for providing wiring to be connected to the electrical mounting module from within the cavity wall. Preferably the electrical container also includes access holes in one or more of the side walls of the electrical container for providing wiring to be connected to the electrical mounting module from within the cavity wall. This arrangement allows for installation during building stage and follow up electrical connection in a single run. This makes a clear and substantial contribution to the commercial construction of a complex building.

The cavity container can include side mountings for connection to wall studs and mounting of the plaster.

Preferably the side mountings of the cavity container has integral wings extending outwardly and substantially normal to the side walls of the cavity container allowing for overlap over the studs and attachment thereto while allowing plaster to overly the integral wings to cause flush fitting.

Preferably the wall cavity electrical cupboard system can include a closing module having a hinge connection mountable in one side of the circumferential channel for receiving and holding the door at one end and a latch means in the opposing side of the circumferential channel of the door at the distal end for latching the door closed.

Preferably the latching means is a push catch module allowing for flush mounting without external openings.

Preferably the cavity electrical cupboard includes a finishing module attachable to the cavity container to allow a wet finishing.

The finishing module of the cavity electrical cupboard can include a plurality of elongated walls with a top continuous beading wherein the elongated walls are attachable to the inside of the circumferential side walls of the cavity container for allowing plaster and wet plaster filling to be fixed up to the beading and allow flush finishing.

Preferably the cavity electrical cupboard includes a finishing module attachable to the cavity container to allow a dry finishing. Preferably the finishing module of the cavity electrical cupboard includes a plurality of elongated walls with a top outwardly extending overhang wherein the elongated walls are attachable to the inside of the circumferential side walls of the cavity container for allowing plaster and to be fixed up under the overhang and allow flush finishing.

In a related embodiment of the present invention there is disclosed a method of forming a wall cavity electrical cupboard system for allowing flush mounting with ready electrical access including the steps of: providing a base mounting module including a cavity container having a rear wall and circumferential side walls with a front opening and mountable substantially flush to and between a set of parallel spaced studs; mounting an electrical mounting module including an electrical container sized smaller than the cavity container into the cavity container allowing circumferential spacing forming a circumferential channel between the electrical container and the side walls of the cavity container; mounting a door to the base mounting module with a hinge connection mountable in one side of the circumferential channel for receiving and holding the door at one end and a latch means in the opposing side of the circumferential channel of the door at the distal end for latching the door closed and being substantially flush to the wall.

Preferably the method of forming a wall cavity electrical cupboard system further includes the step of providing a finishing module allowing a wet flush mounting by: connecting a plurality of elongated walls with a top continuous beading wherein the elongated walls are attachable to the inside of the circumferential side walls of the cavity container for allowing plaster and wet plaster filling to be fixed up to the beading and allow flush finishing.

Preferably the method of forming a wall cavity electrical cupboard system further includes the step of providing a finishing module allowing a wet flush mounting by: a plurality of elongated walls with a top outwardly extending overhang wherein the elongated walls are attachable to the inside of the circumferential side walls of the cavity container for allowing plaster and to be fixed up under the overhang and allow flush finishing.

It can be seen that the invention of a wall cavity electrical cupboard system provides the benefit of easy access to switches and fuses and easy installation of electrical cabling.

Other aspects of the invention are also disclosed.

BRIEF DESCRIPTION OF THE DRAWINGS

Notwithstanding any other forms which may fall within the scope of the present invention, preferred embodiments of the invention will now be described, by way of example only, with reference to the accompanying drawings in which.

DETAILED DESCRIPTION

Figure 1:
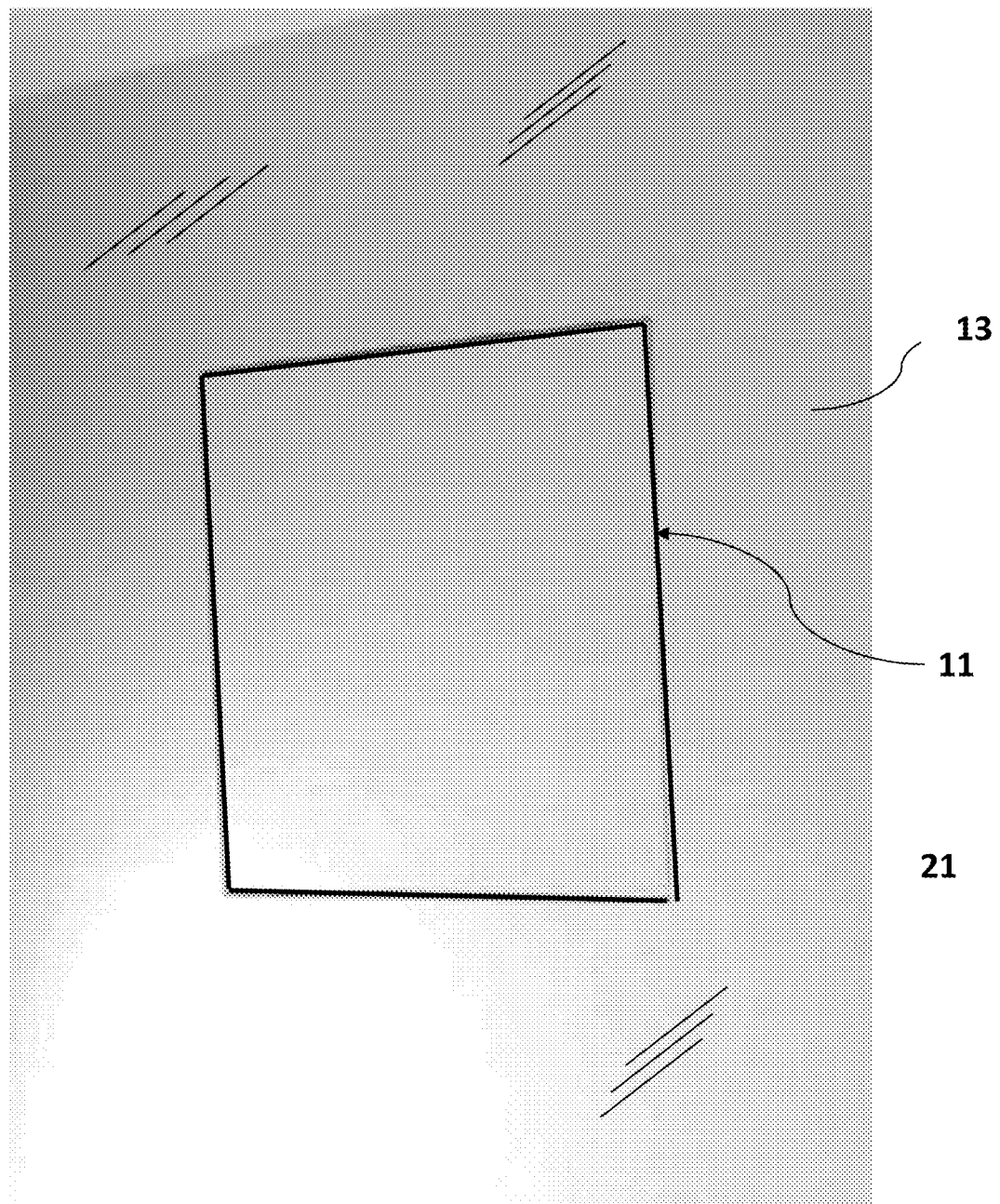
FIG. 1 is a wall cavity electrical cupboard system allowing flush mounting with ready electrical access in accordance with a preferred embodiment of the present invention.

It should be noted in the following description that like or the same reference numerals in different embodiments denote the same or similar features.

Referring to FIG. 1 there is shown a wall cavity electrical cupboard system 11 in-situ, providing flush mounting to a wall 13 with ready electrical access. As further exemplified in one form in the drawings, the wall cavity electrical cupboard system comprises a base mounting module 25 (best seen FIGS. 4 and 5) including a cavity container 31, an electrical mounting module 26 (best seen in FIG. 8) having an electrical container 49 (best seen in FIGS. 6 and 7), the electrical container 49 adapted to be received within the cavity container 31 of the base mounting module 25 and sized to allow circumferential spacing forming a circumferential channel 29 (best seen in FIGS. 2 and 4) between the electrical container and the side walls of the cavity container, and a closing module 75 (refer FIGS. 12 and 13) adapted to be received within the circumferential channel and provide a finished flush mount with the wall 13.

Our enclosure comprises of 5 main parts:
a) PART 1: Mounting frame being the base mounting module 25
b) PART 2: Enclosure being the electrical mounting module 26
c) PART 3: Mechanical protection plate 46—to be fixed to mounting box to protect cables from rear damage—required to meet Aus standards in multi residential buildings
d) PART 4: Door kit wet—for plastering into the wall (troweling over)
e) PART 5: Door kit dry—for installing when the door kit wet has not been used (optional extra) The face/door of the enclosure will come primed ready for painting with the wall.

Figure 4:
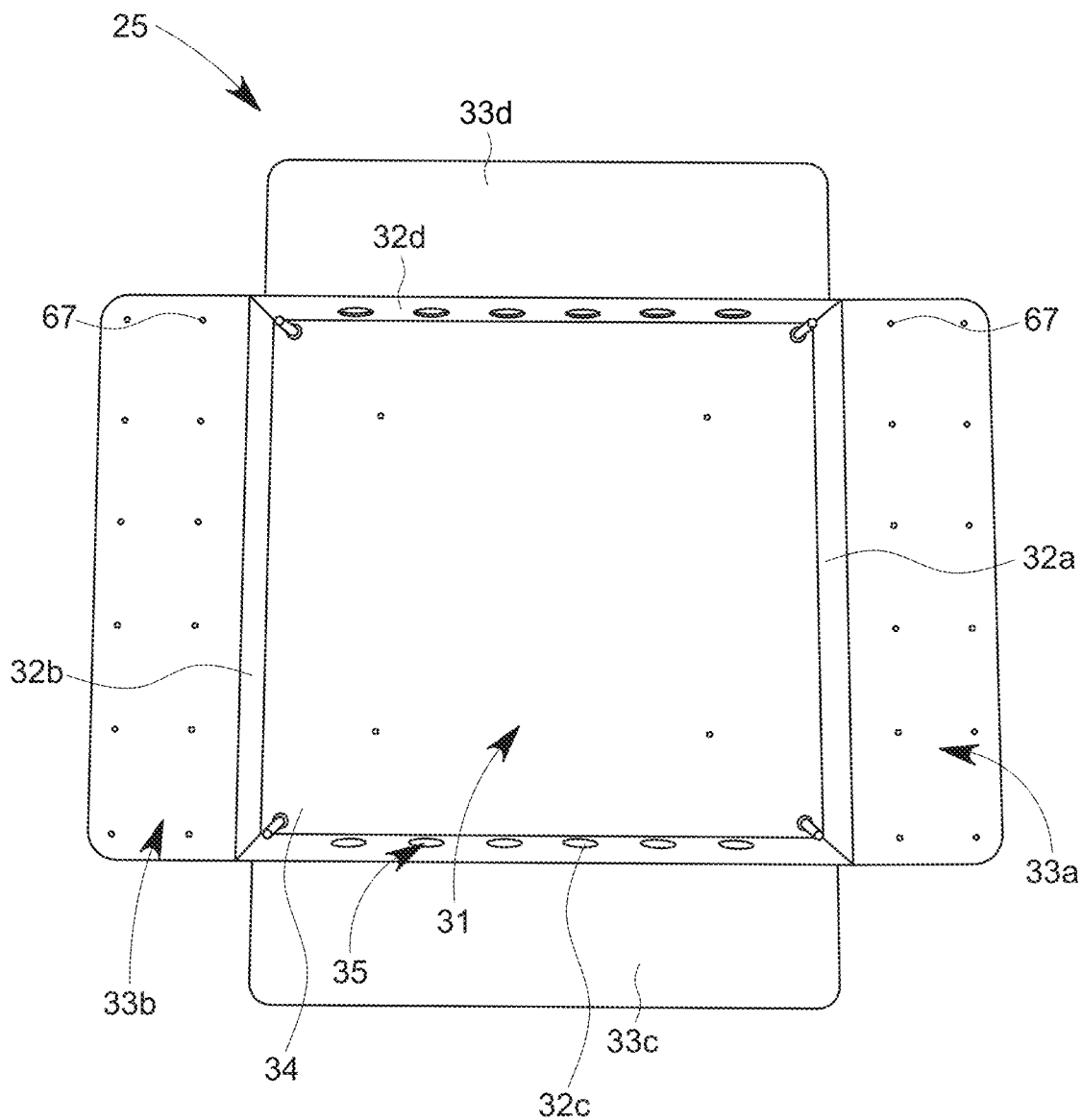
FIG. 4 is a photographic representation in overhead plan view of a base mounting module for the wall cavity electrical cupboard system in accordance with this disclosure.
Figure 5:
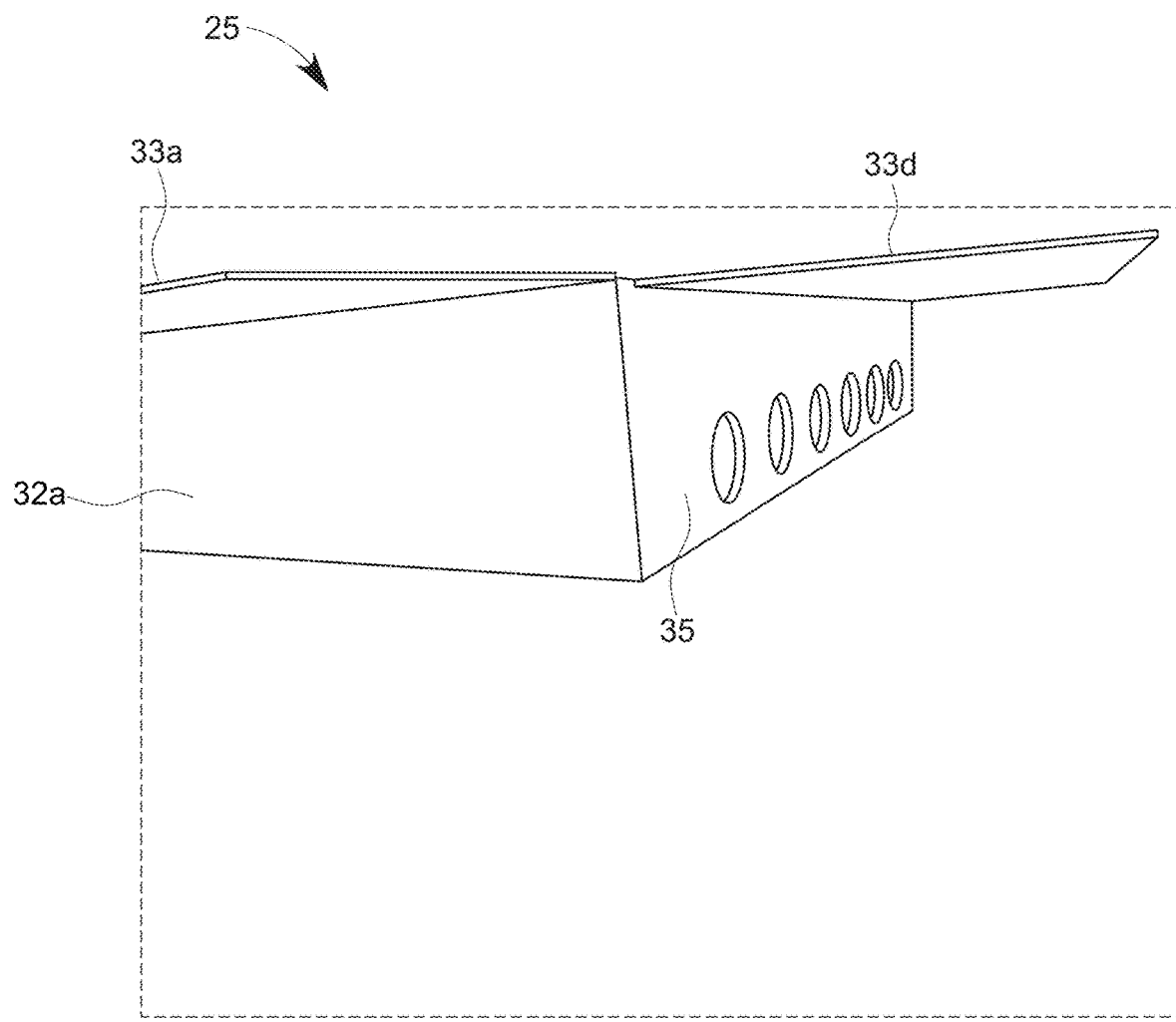
FIG. 5 is a photographic representation in part side elevation of the base mounting module of FIG. 4.

As shown in FIG. 4, the base mounting module 25 in accordance with one embodiment of the present invention comprises a cavity container 31 comprising a flat rear wall or floor portion 34 which is substantially square or rectangular and circumferential side walls 32a, 32b, 33c and 32d on four sides with a front opening. The cavity container further includes side mounting flaps 33a, 33b, 33c and 33d integral with and extending at right angles outwardly from the side walls 32a, 32b, 32c and 32d in a common plane parallel to the plane of the floor portion 34.

The opposite side mounting flaps 33a and 33b include a series of spaced apart openings 67 that allow mounting attachment of the base mounting module 25 to a set of parallel spaced wall studs 15 and for the cavity container 31 to extend substantially between the set of parallel spaced wall studs 15 (see FIG. 2) and flush with the mounting of plaster on the wall. In this condition, the opposite side mounting flaps 33c and 33d are positioned between the set of parallel studs.

At least two of the side walls 32a, 32b, 32c and 32d have holes 35 sized to receive cabling and providing access to the central volume of the cavity container 31 for later connection to the electrical mounting module to be fixed therein.

It can be seen that the cavity container 31 can be mounted to the stud walls and general wiring undertaking and feeding to the container through the holes so that the construction of walls ids not held up and the The wall cavity electrical cupboard system 11 further includes an electrical mounting module 26 (see FIG. 8) which is received within the cavity 31 of the base mounting module 25 seated on the rear wall or floor portion 34 thereof.

The electrical mounting module 26 comprises an electrical container 49 (best seen in FIGS. 6 and 7) and a protection plate 46. The electrical container 49 is sized substantially square or rectangular but smaller than the cavity container 31 to which it is attached to form a circumferential channel 29. The electrical container is also an open front container with side walls extending from a floor on which two spaced support brackets 47a and 47b extend parallel to support fuses and the like and the connected wiring. The container 49 is of a depth to allow receipt of electrical wiring and fuses while not extending proud of the top of the side walls 32a, 32b, 32c and 32d of the cavity container 31.

A protection plate 46 is fixedly mounted over the open front to the top of the walls of the electrical container and includes spaced cut-out portions 27a and 27b coinciding with spaced support brackets 47a and 47b, the support brackets being adapted to mount electrical switches 39 protruding through the corresponding cutout openings 27 but not proud of the container.

The cavity container 31 of the base mounting module and the electrical container of the electrical mounting module are sized to allow forming of a circumferential channel 29 between the electrical container 49 and the side walls 32a, 32b, 32c and 32d of the cavity container 31.

It can be seen that the electrical mounting module can be installed in the wall after the time of the main building and plastering. In particular because wiring through the wall can enter through the side openings of the cavity container The circumferential channel 29 also provides the benefit of allowing the wiring to be located while the circumferential channel allows mounting of the closing module 75 without affecting the plastered wall. It further allows the finishing module to have finishing plates attached or integral with the side walls 32a, 32b, 32c and 32d of the cavity container 31 so that plaster can in a dry wall about the finishing plate or in a wet wall have a mesh plate, or beading 95 extend over the plaster to have a wet plaster smoothed over and up to and abutting the edge of the finishing plate. The finishing plate can have beading 95 at a top edge that thereby surrounds the cavity and provides the flush line of the front of the system to the adjacent wall 13.

The circumferential channel 29 can further include the fastening means of the closing module 75 so that one part 79a is on the rear of the door 77 and the second part 78a and 78b are within the circumferential channel 29. Further the hinges 76a and 76b are in the opposite portion of the circumferential channel 29. Still further the rolled edges of the front door 77 can fit within the channel.

Figure 2:
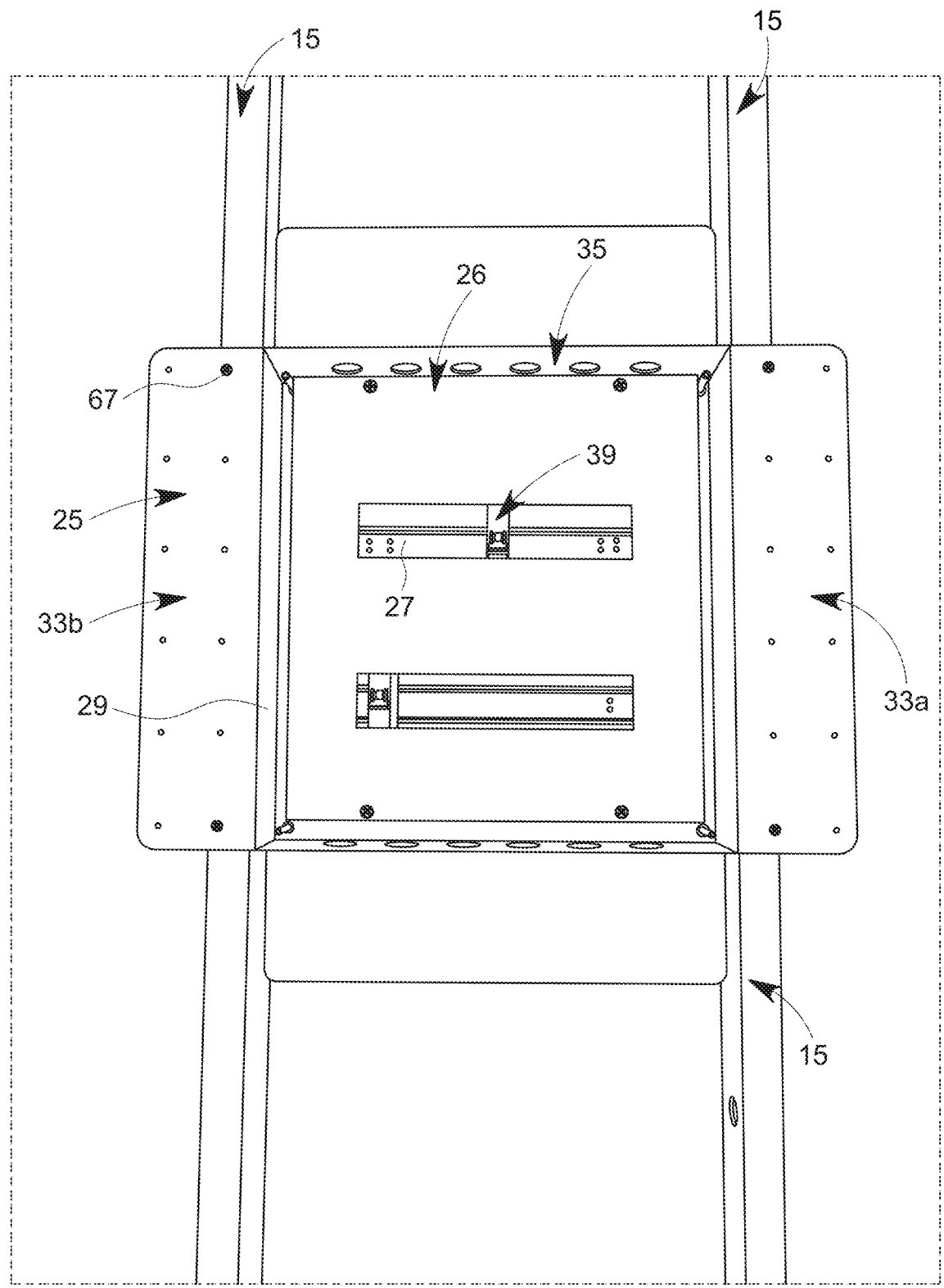
FIG. 2 is a photographic representation of a part installed wall cavity electrical cupboard system in-situ which allows flush mounting with ready electrical access.
Figure 3:
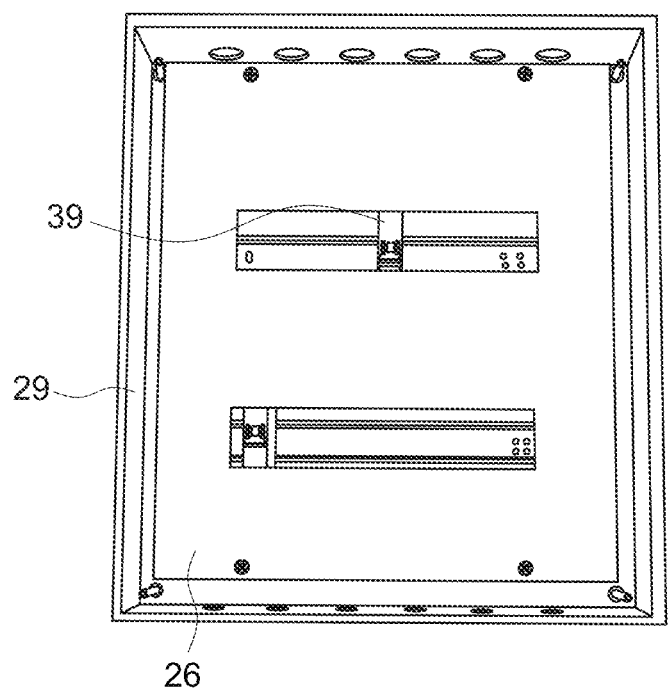
FIG. 3 is a photographic representation of the module in FIG. 2 installed in-situ and flush mounting to a wall surface.

As shown in FIG. 2, opposite side mountings 33a and 33b include a plurality of openings 67 which allow fastening of the base mounting module by screws to the wall studs 15.

Figure 6:
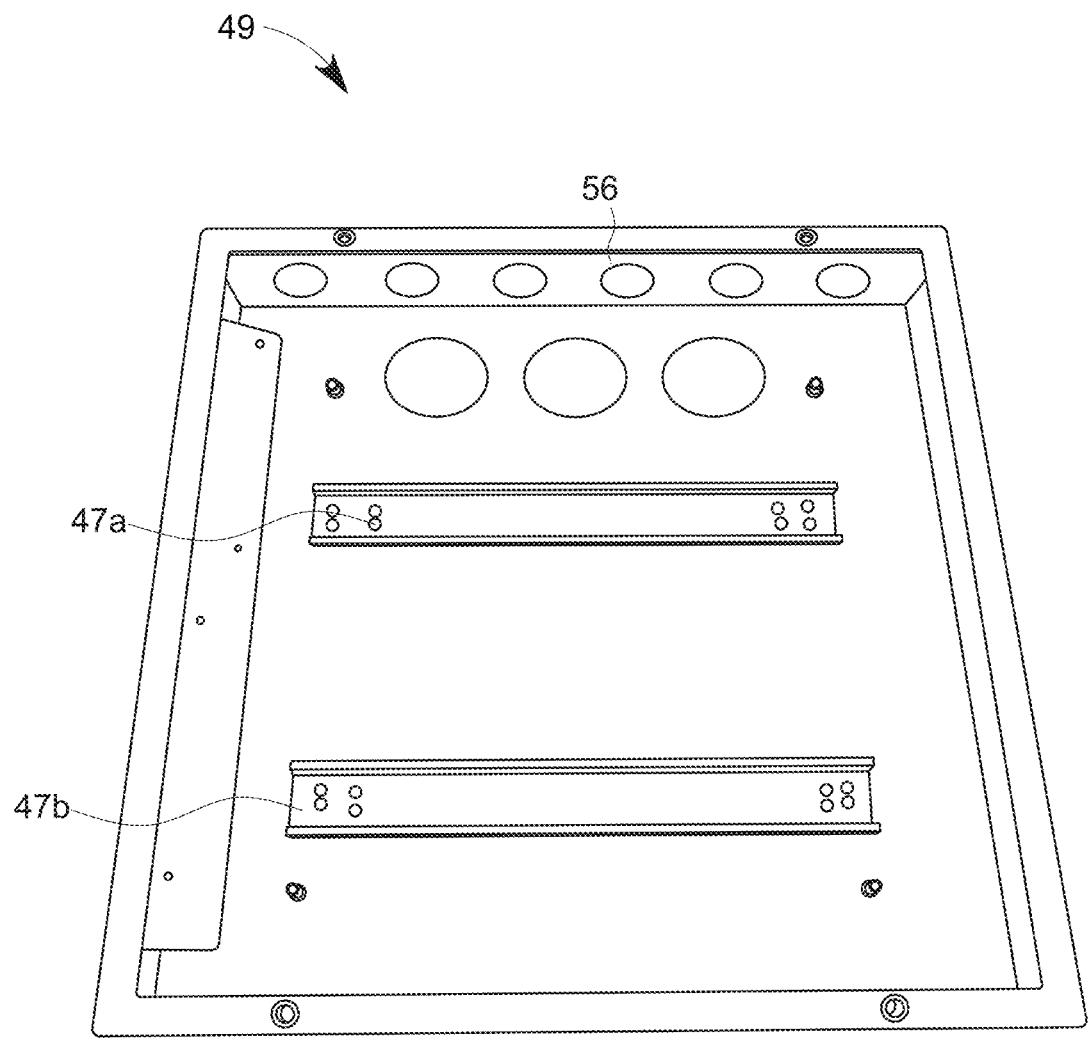
FIG. 6 is a photographic representation in part overhead plan view of an electrical container forming part of an electrical mounting module in accordance with this disclosure.
Figure 7:
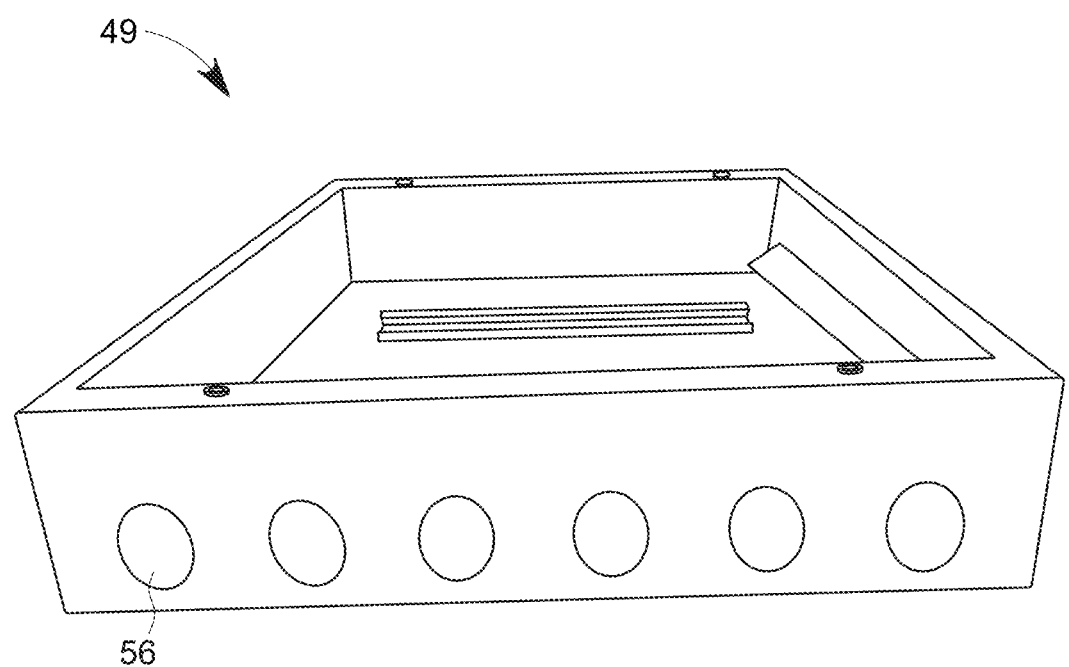
FIG. 7 is a photographic representation in side elevation of the electrical container of FIG. 6.
Figure 8:
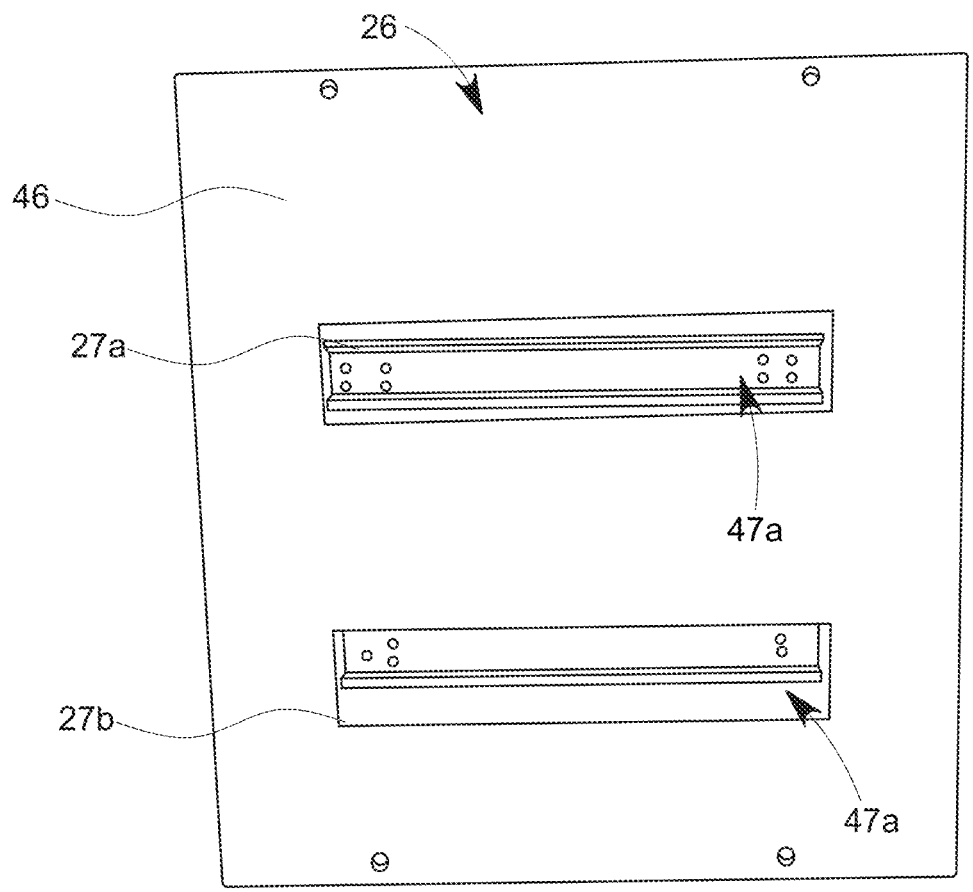
FIG. 8 is a photographic representation in overhead plan view of an electrical mounting module of the present disclosure including a protection (cover) plate.
Figure 9:
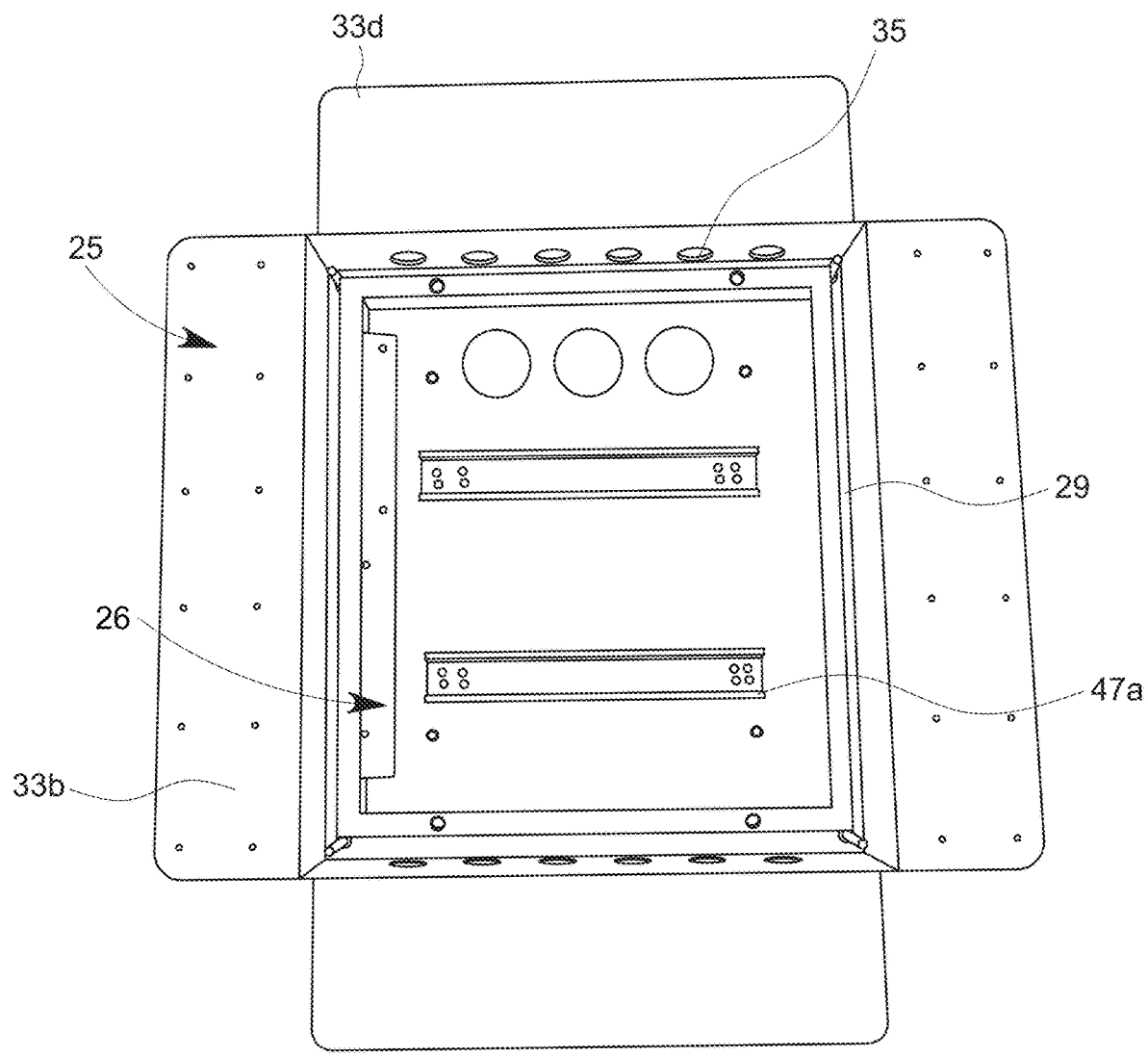
FIG. 9 is a photographic representation in overhead plan view of a part assembly of the wall cavity electrical cupboard system showing combined base mounting module of FIG. 4 and electrical container of FIG. 6.

In FIGS. 2 to 5, the cavity container 31 includes access holes 35 in opposite side walls 32c and 32d of the cavity container for providing wiring to be connected to the electrical mounting module from within the cavity wall. In the embodiment shown in FIG. 2, the access holes 35 in walls of the cavity container are aligned parallel with the wall studs 15. The electrical container 49 as shown in FIGS. 6 and 7 also includes template openings 56 in the side walls are aligned and located to align with access holes 35.

The cavity container 31 has side mountings 33a and 33b for connection to the studs 15 and mounting of the plaster board or sheeting thereon. As shown in FIG. 4 the side mountings of the cavity container include integral wings extending outwardly and substantially normal to the side walls of the cavity container allowing for overlap over the studs and attachment thereto while allowing the plaster (see FIGS. 1 and 3) to overly the integral wings to cause flush fitting.

Figure 10:
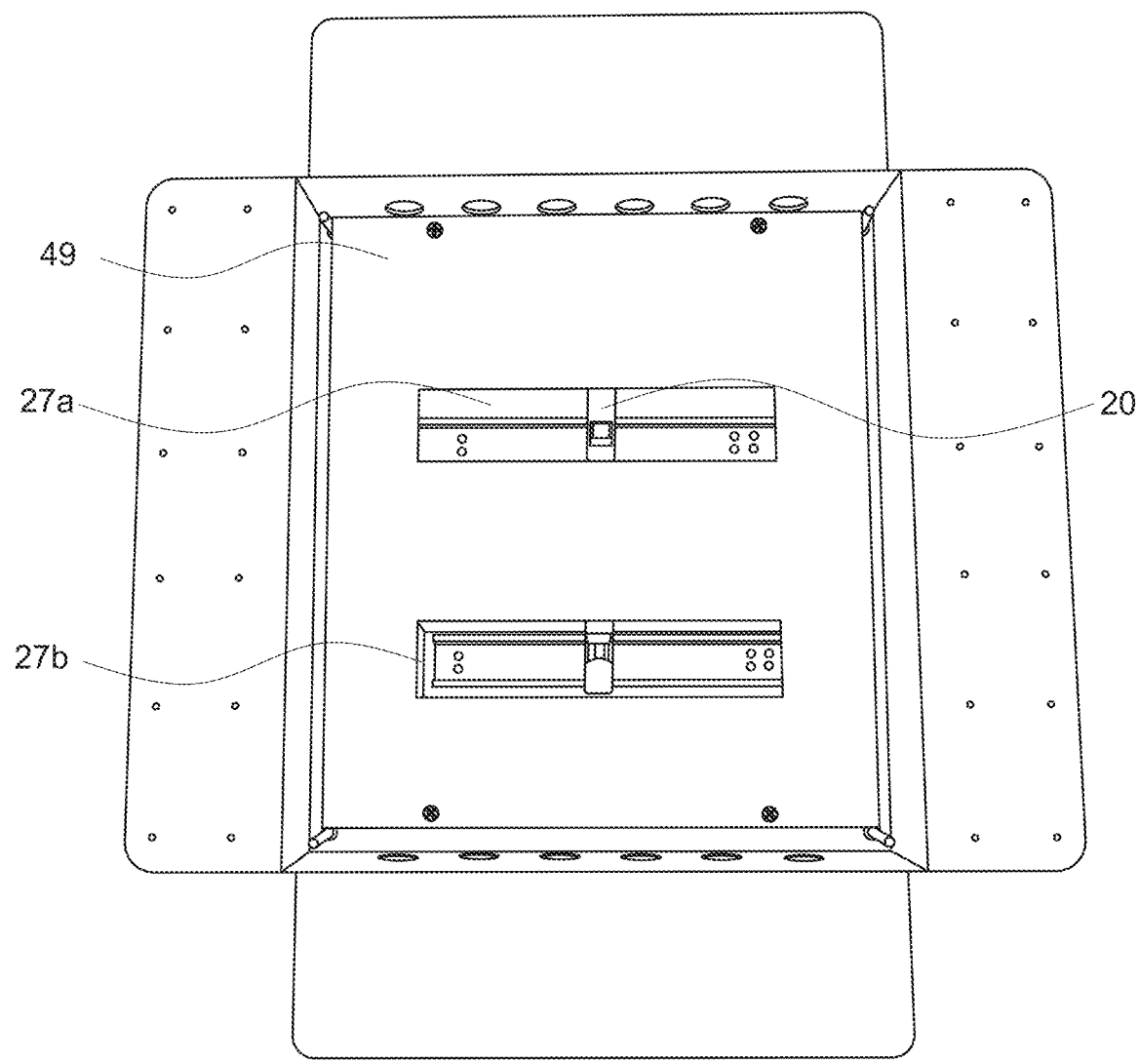
FIG. 10 is a photographic representation in overhead plan view of a part assembly of the wall cavity electrical cupboard system showing combined base mounting module of FIG. 4 and electrical mounting module of FIG. 8.
Figure 11:
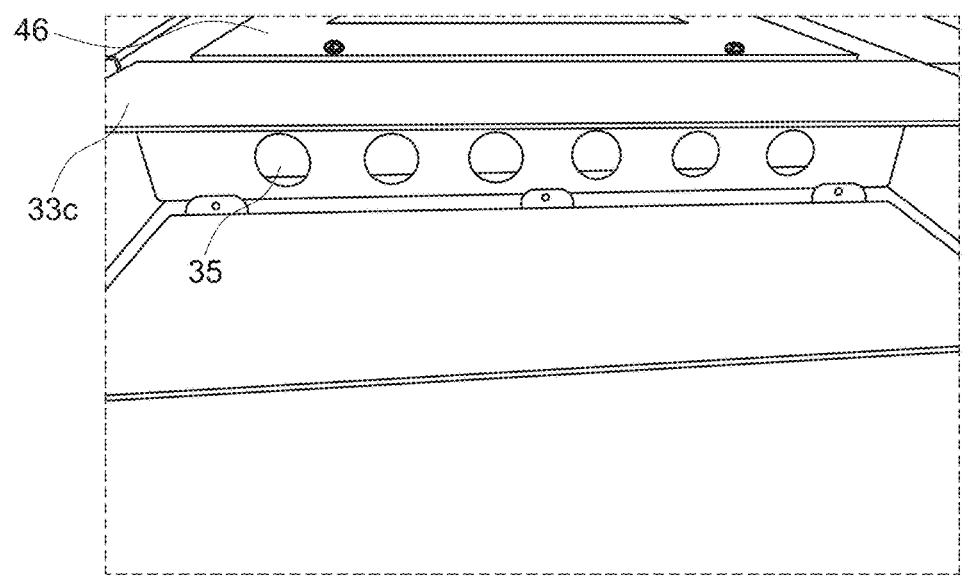
FIG. 11 is a photographic representation of side elevation of the assembly of FIG. 10 in-situ.

It can be seen, such as in FIG. 10, that the wiring that is received through holes 35 of the cavity container 31 and can feed along the circumferential channel 29 and into holes of the template openings 56 and can be connected to control means in the electrical mounting module mounted on the support brackets 47a 47b such as fuses, surge protectors, short circuit protection cutoffs etc. Further the power can be properly distributed by the wiring to the different electrical pathways through the premises based on their individual requirements, collective requirements and for reasons of power balancing and importance of circuitry loads. Only the front switches or indicators 20 appear through the cut outs 27a 27b. The channel and the template openings provides a benefit that the wiring therefore can be selectively moved around and readily connected without needing to line up the holes of the cavity container 31 and the electrical container 49 and with adjustability and safety of placing wiring connection behind the sealing protector plate 46 covering the opening except for what is allowable to show through the cutouts 27a 27b and be mounted on the support brackets 47a 47b.

Overall the system allows for flush mounting while allowing for improvement in connection without affecting different trades and providing flexibility for the electrician to provide the required electrical circuits without breaking completed walls or requiring wall repairs after final wiring.

EXAMPLE

A new flush type switchboard. The new design incorporates a new installation module and process. In the finish, there is no protrusion past the plaster wall—or exceedingly small, e.g. a couple of mm. As displayed above all other enclosures on the market stand out, off the wall i.e. 10+mm.

Figure 12:
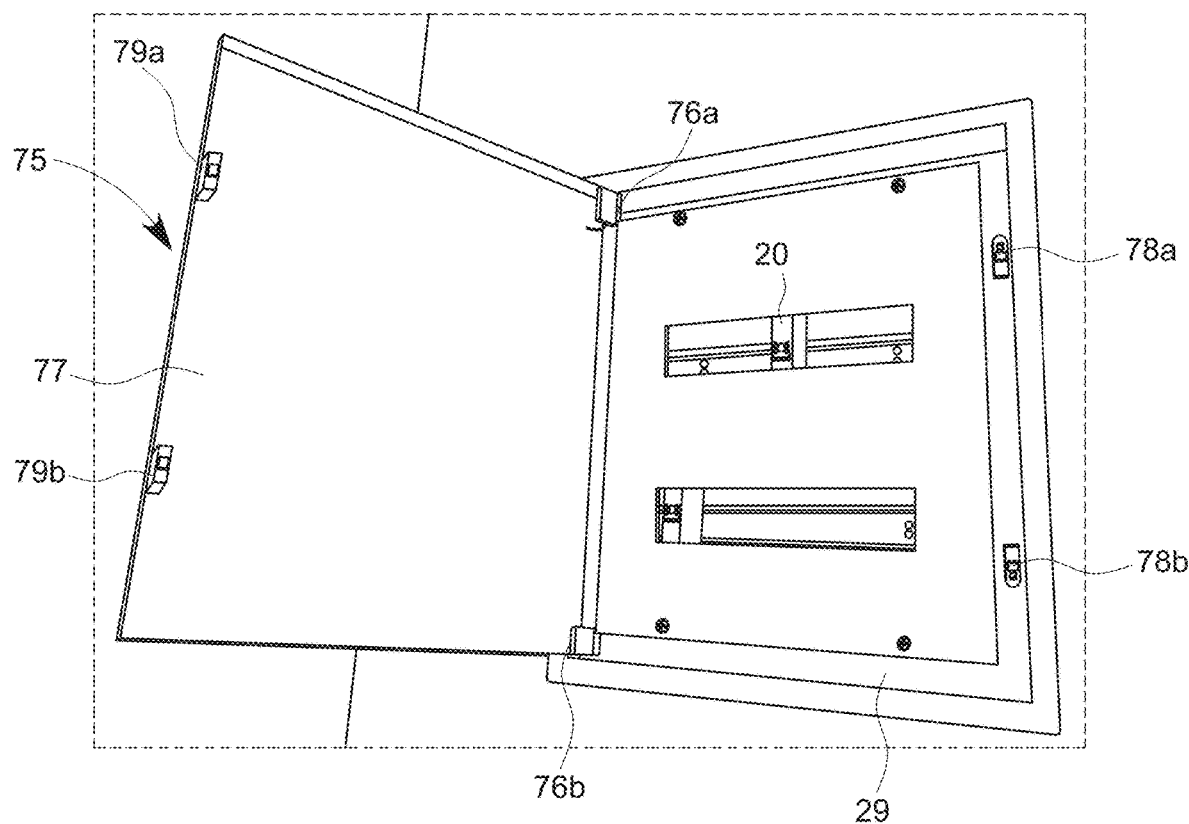
FIG. 12 is a photographic representation of an assembly with door hingedly open.

This enclosure has been prototyped as a 26-pole enclosure—(this relates to the capacity of single pole circuit breakers it can hold). We can have several sizes all with the same concept available. [0051] As further shown in FIGS. 12 and 13, the wall cavity electrical cupboard system includes a closing module 75 having a hinge connection 76 mountable in one side of the circumferential channel 29 for receiving and holding a door 77 at one end and a latch means 78a and 78b in the opposing side of the circumferential channel of the door at the distal end for latching the door closed with connectors 79a and 79b on inside portions of the door. In the embodiment shown in FIG. 12 the latching means is a push catch and release module allowing the door to be received within the circumferential channel 29 for flush mounting without external openings. FIGS. 10 and 12 show a fuse or circuit breaker 90 mounted in support brackets 47a and 47b accessible through openings 27a and 27b in protection plate 46.

Figure 13:
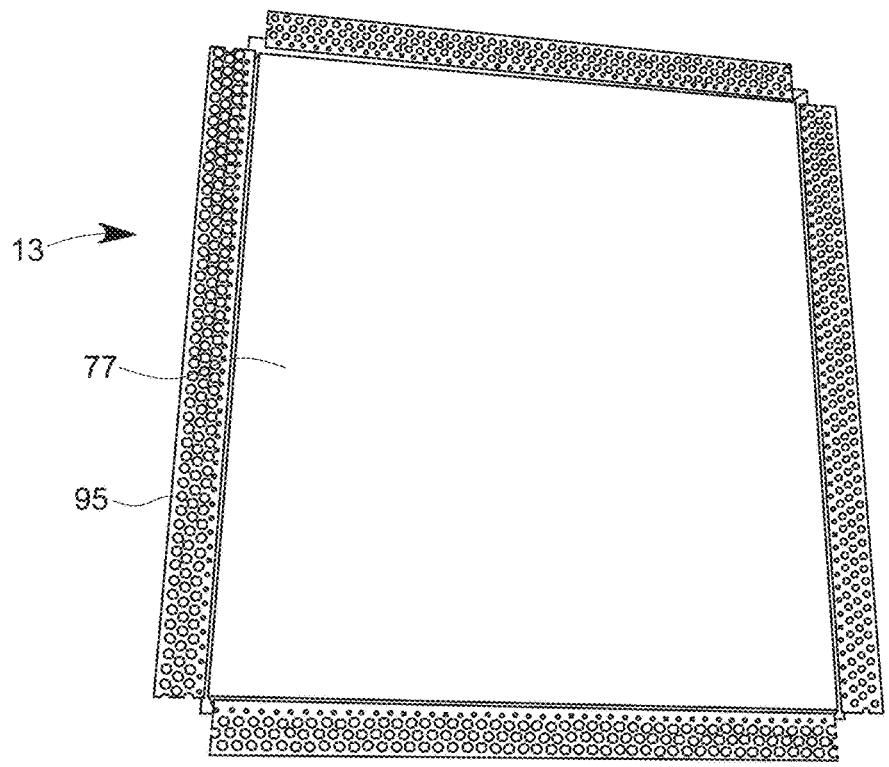
FIG. 13 is a photographic representation of an assembly with door closed.

As shown in FIG. 13, the door 77 is hingedly mounted to the base mounting module and received within the circumferential channel 29 for closing the front opening in the wall cavity and being substantially flush to the wall 13.

Figure 14:
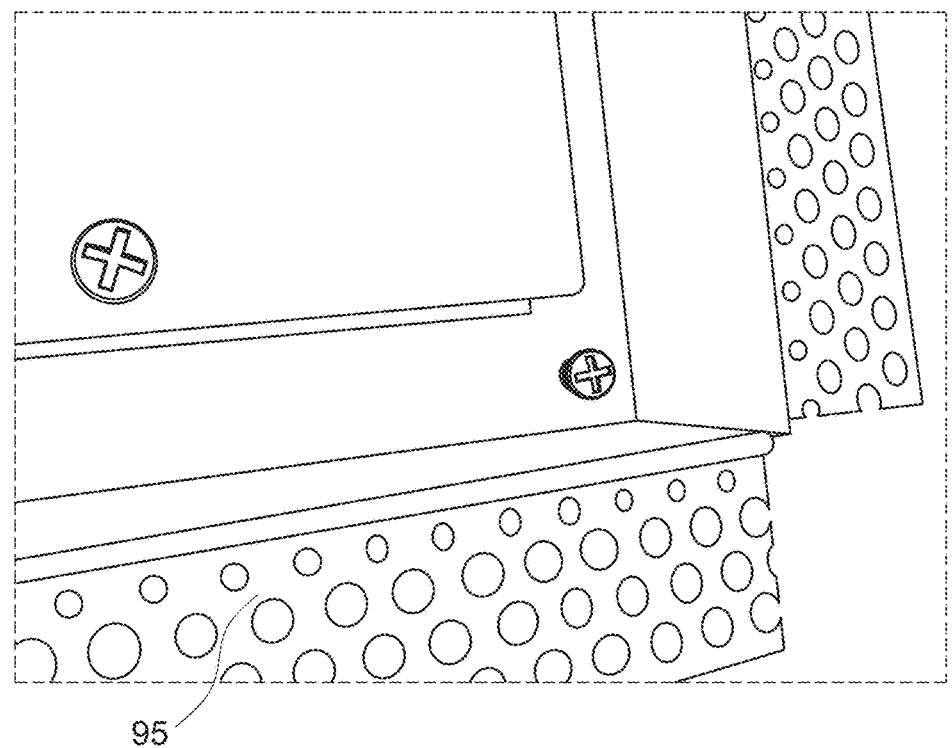
FIG. 14 is a photographic representation showing an close-up view of a corner portion of installed wall cavity electrical cupboard system with external beading prior to finishing plaster coat.

As further shown in FIGS. 13 and 14, the wall cavity electrical cupboard system includes a finishing module having circumferential beading 95 about the periphery of the door 77. The beading is subsequently plastered over (FIG. 1) producing a substantially flush finish to the wall 13.

Figure 15:
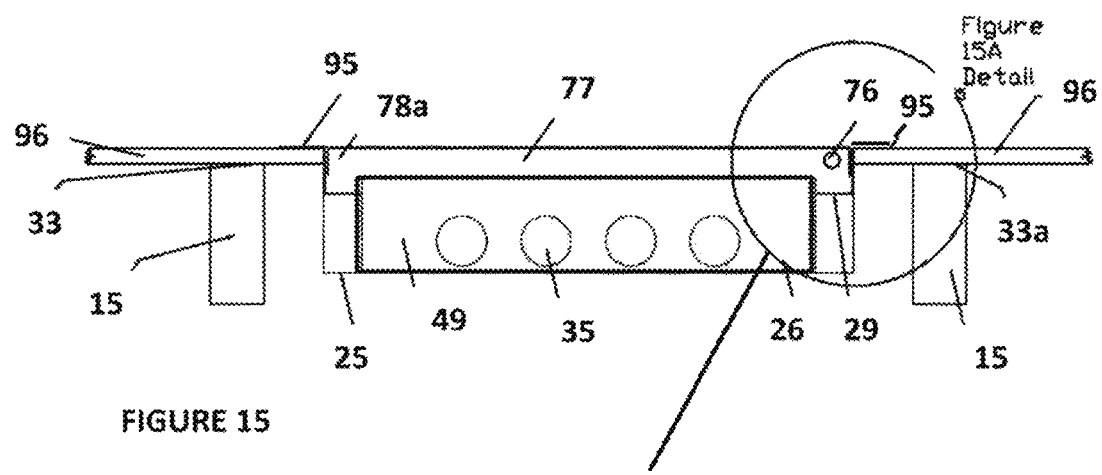
FIGS. 15 and 15A is a schematic representation in vertical cross-section of an assembly of the wall cavity electrical cupboard system mounted in-situ within a wall cavity flush to external wall by wet plaster process.
Figure 15A:
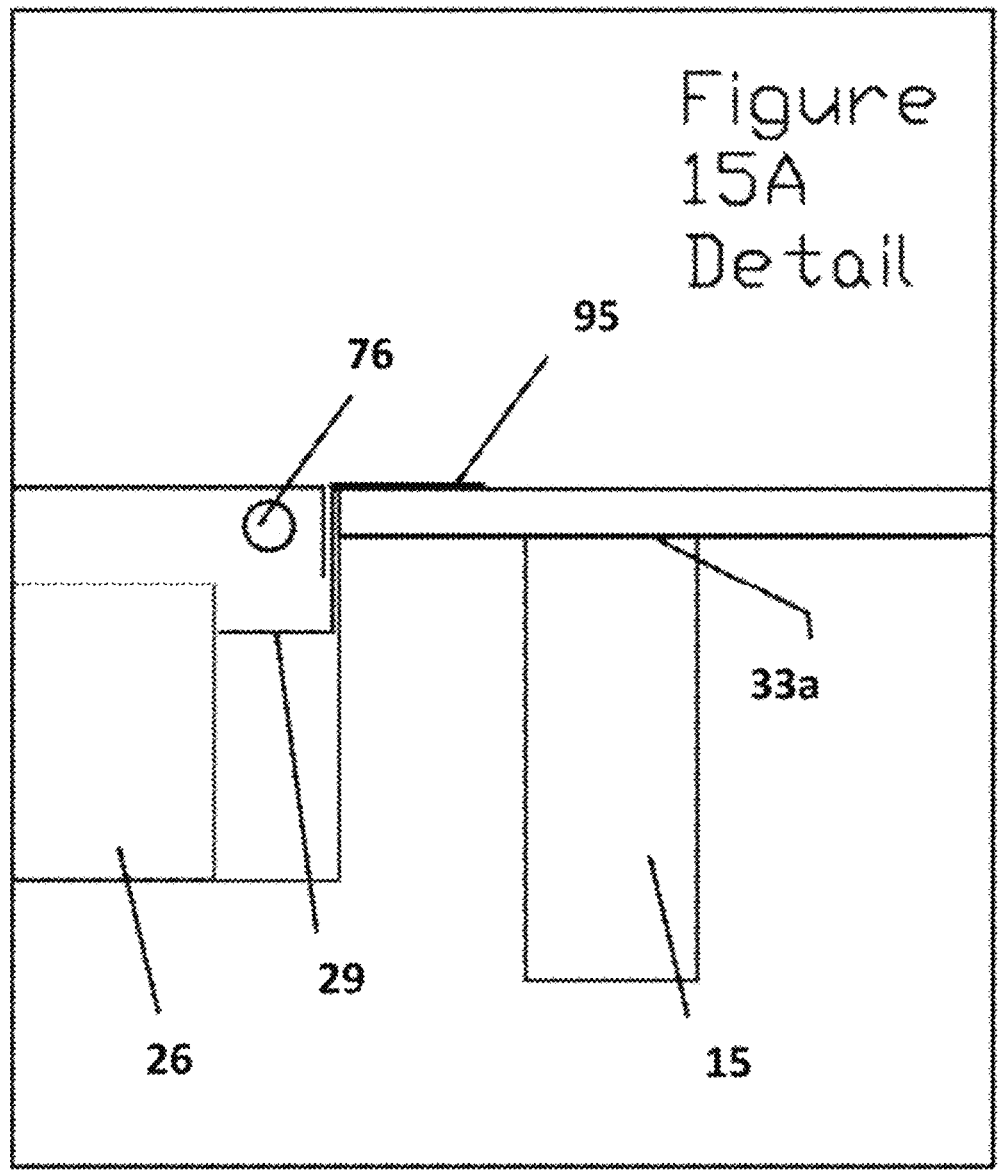
Figure 16:
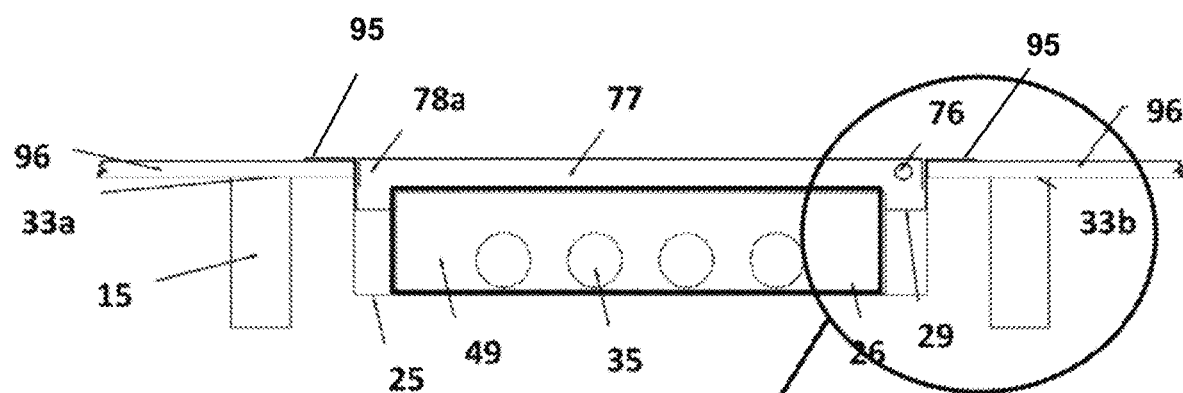
FIGS. 16 and 16A is a schematic representation in vertical cross-section of an assembly of the wall cavity electrical cupboard system mounted in-situ within a wall cavity flush to external wall by dry installation process.
Figure 16A:
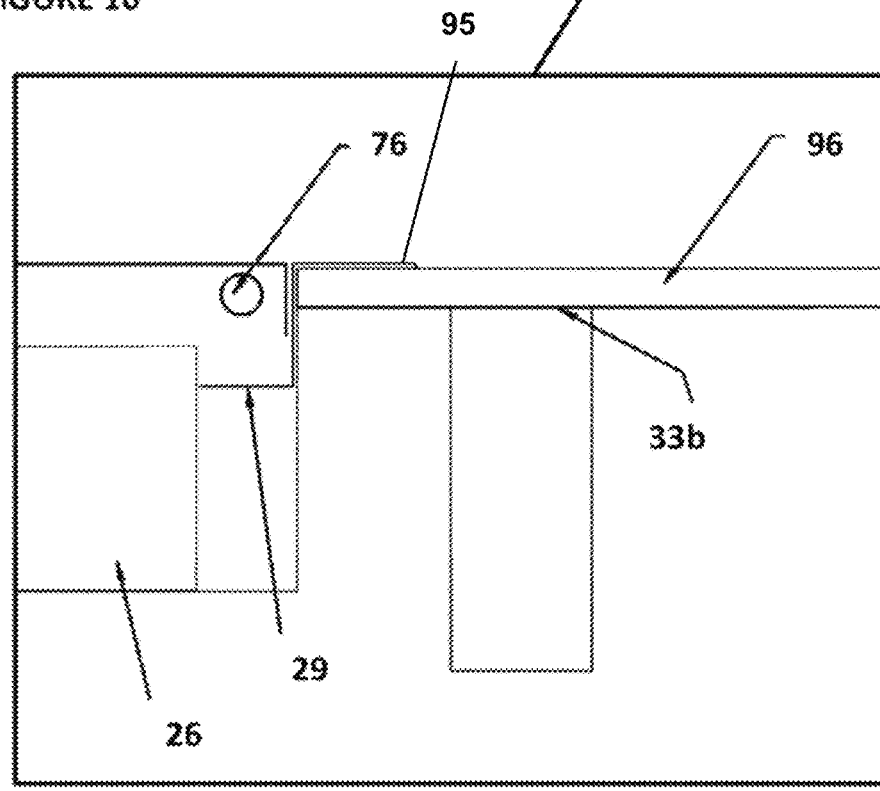

Referring to FIGS. 15 to 17 there is illustrated a method of forming a wall cavity electrical cupboard system according to embodiments of the invention for allowing flush mounting with ready electrical access including the steps of:
a) providing a base mounting module 25 including a cavity container having a rear wall and circumferential side walls with a front opening and mountable substantially flush to and between a set of parallel spaced studs;
b) mounting an electrical mounting module 26 including an electrical container sized smaller than the cavity container into the cavity container allowing circumferential spacing forming a circumferential channel 29 between the electrical container and the side walls of the cavity container;
c) mounting a door 77 to the base mounting module with a hinge connection 76 mountable in one side of the circumferential channel for receiving and holding the door at one end and a latch means 78a in the opposing side of the circumferential channel of the door at the distal end for latching the door closed and being substantially flush to the wall or plaster sheet 96;
d) providing a finishing module allowing a wet flush mounting by connecting a plurality of elongated walls with a top continuous beading 95 wherein the elongated walls are attachable to the inside of the circumferential side walls of the cavity container for allowing plaster and wet plaster filling to be fixed up to the beading and allow flush finishing.

INTERPRETATION

Embodiments

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

INDUSTRIAL APPLICABILITY

It is apparent from the above, that the arrangements described are applicable to the electrical and building industries.

The invention claimed is:

1. A wall cavity electrical cupboard system for allowing flush mounting with ready electrical access comprising:
    a base mounting module including a cavity container having a flat rear wall and circumferential side walls with a front opening and side mounting flaps integral with and extending at right angles outwardly from the top of the side walls to allow mountable attachment of the base mounting module substantially flush to and between a set of parallel spaced studs and allowing mounting of plaster board or sheeting thereover to cause flush fitting;
    an electrical mounting module including an electrical container having a rear wall and circumferential side walls with at least one front opening for holding a plurality of electrical fittings including switches and fuses, and the electrical container being mountable in the cavity container and sized to allow circumferential spacing forming a circumferential channel between the electrical container and the side walls of the cavity container and not extending proud of the circumferential side walls of the cavity container;
    wherein the cavity container has access holes in opposite side walls of the cavity container for providing wiring to be connected to the electrical mounting module from within the cavity wall;
    wherein the electrical container has access holes in one or more of the side walls of the electrical container aligned with the access holes in the cavity container for providing wiring to be connected to the electrical mounting module from within the cavity wall; and
    a door mounted to the base mounting module adapted to be received within the circumferential channel for closing the front opening and being substantially flush to the wall.

2. The wall cavity electrical cupboard system of claim 1 further comprising a closing module having a hinge connection mountable in one side of the circumferential channel for receiving and holding the door at one end and a latching means in the opposing side of the circumferential channel of the door at the distal end for latching the door closed.

3. The wall cavity electrical cupboard system of claim 2 wherein the latching means is a magnetic module allowing for flush mounting without external openings.

4. The wall cavity electrical cupboard system of claim 1 wherein the wall cavity electrical cupboard system includes a finishing module attachable to the cavity container to allow a wet finishing.

5. The wall cavity electrical cupboard system of claim 4 wherein the finishing module of the wall cavity electrical cupboard system includes a plurality of elongated walls with a top continuous beading wherein the elongated walls are attachable to the inside of the circumferential side walls of the cavity container for allowing plaster and wet plaster filling to be fixed up to the beading and allow flush finishing.

6. The wall cavity electrical cupboard system of claim 1 wherein the wall cavity electrical cupboard system includes a finishing module attachable to the cavity container to allow a dry finishing.

7. The wall cavity electrical cupboard system of claim 6 wherein the finishing module of the wall cavity electrical cupboard system includes a plurality of elongated walls with a top outwardly extending overhang wherein the elongated walls are attachable to the inside of the circumferential side walls of the cavity container for allowing plaster and to be fixed up under the overhang and allow flush finishing.

8. A method of forming a wall cavity electrical cupboard system for allowing flush mounting with ready electrical access including the steps of:
    providing a base mounting module including a cavity container having a flat rear wall and circumferential side walls with a front opening and side mounting flaps integral with and extending at right angles outwardly from the top of the side walls to allow mountable attachment of the base mounting module substantially flush to and between a set of parallel spaced studs and allowing mounting of plaster board or sheeting thereover to cause flush fitting;
    mounting an electrical mounting module including an electrical container having a rear wall and circumferential side walls with at least one front opening for holding a plurality of electrical fittings including switches and fuses, sized smaller than the cavity container, into the cavity container allowing circumferential spacing forming a circumferential channel between the electrical container and the side walls of the cavity container and not extending proud of the circumferential side walls of the cavity container;
    mounting a door to the base mounting module with a hinge connection mountable in one side of the circumferential channel for receiving and holding the door at one end and a latch means in the opposing side of the circumferential channel of the door at the distal end for latching the door closed and being substantially flush to the wall; and
    providing a finishing module allowing a wet flush mounting by:
        connecting a plurality of elongated walls with a top continuous beading wherein the elongated walls are attachable to the inside of the circumferential side walls of the cavity container for allowing plaster and wet plaster filling to be fixed up to the beading and allow flush finishing.

9. The method of forming a wall cavity electrical cupboard system of claim 8 further comprising providing a finishing module allowing a wet flush mounting by:

a plurality of elongated walls with a top outwardly extending overhang wherein the elongated walls are attachable to the inside of the circumferential side walls of the cavity container for allowing plaster and to be fixed up under the overhang and allow flush finishing.

* * * * *